US012643377B2

(12) United States Patent　　(10) Patent No.:　US 12,643,377 B2
Alam et al.　　　　　　　　　　(45) Date of Patent:　　Jun. 2, 2026

(54) OPENING/CLOSING DEVICE FOR VEHICLE SLIDING-WINDOW PANEL

(71) Applicant: MITSUI KINZOKU ACT CORPORATION, Yokohama (JP)

(72) Inventors: Mohammad Numan Alam, Yokohama (JP); Kyle Ellsworth, Yokohama (JP); Makoto Kaburaki, Yokohama (JP)

(73) Assignee: MITSUI KINZOKU ACT CORPORATION, Yokohama (JP)

( * ) Notice: Subject to any disclaimer, the term of this patent is extended or adjusted under 35 U.S.C. 154(b) by 539 days.

(21) Appl. No.: 17/963,748

(22) Filed: Oct. 11, 2022

(65) Prior Publication Data

US 2023/0113049 A1　　Apr. 13, 2023

(30) Foreign Application Priority Data

Oct. 12, 2021　　(JP) .................................. 2021-167467

(51) Int. Cl.
*B60J 1/18*　　　(2006.01)
*B60J 1/00*　　　(2006.01)
*E05F 11/38*　　(2006.01)

(52) U.S. Cl.
CPC ............. *B60J 1/1853* (2013.01); *B60J 1/004* (2013.01); *E05F 11/382* (2013.01)

(58) Field of Classification Search
CPC ........ B60J 1/1853; B60J 1/004; E05F 11/382; E05F 15/635; E05F 15/652; E05Y 2201/70; E05Y 2201/701

(Continued)

(56) References Cited

U.S. PATENT DOCUMENTS 1,900,009 A * 3/1933 Christenson .......... E05F 15/652
　　　　　　　　　　　　　　　　　　49/362
3,533,188 A * 10/1970 Jones et al. ............. E05F 15/60
　　　　　　　　　　　　　　　　　　318/135

(Continued)

FOREIGN PATENT DOCUMENTS

JP　　　　H0253478 U　　4/1990
JP　　　　H0336386 A　　2/1991

(Continued)

OTHER PUBLICATIONS

Office Action, issued in Japanese Patent Application No. 2021-167467 dated Apr. 15, 2025.

*Primary Examiner* — Daniel P Cahn
(74) *Attorney, Agent, or Firm* — NIXON & VANDERHYE

(57)　　　　ABSTRACT

An opening/closing device for a vehicle sliding-window panel, includes a sliding-window panel opening and closing an opening part provided in a vehicle body, upper and lower guide rails to support the sliding-window panel to slide, and a slide driving mechanism fixed to one guide rail either the upper or lower guide rail. The slide driving mechanism includes a motor, a lead screw rotated by driving the motor, and a screw nut which is screwed with the lead screw to linearly move in a longitudinal direction of the one guide rail by rotation of the lead screw and is coupled with the sliding-window panel to operate the sliding-window panel to open and close by the linear movement. The one guide rail is integrally formed with a first and second supporting portions which rotatably support both end portions of the lead screw respectively.

3 Claims, 12 Drawing Sheets

Left ←――――→ Right

(58) Field of Classification Search
USPC ................................................ 49/380, 362
See application file for complete search history.

(56) References Cited

U.S. PATENT DOCUMENTS

| | | | | |
|---|---|---|---|---|
| 3,628,298 | A * | 12/1971 | Sickler | E06B 9/01 52/669 |
| 4,068,799 | A * | 1/1978 | Brodin | E05F 15/71 49/362 |
| 4,698,938 | A * | 10/1987 | Huber | F16H 25/2018 49/362 |
| 4,995,195 | A * | 2/1991 | Olberding | B60J 5/00 49/362 |
| 5,077,938 | A * | 1/1992 | Moreuil | E05F 15/635 74/424.89 |
| 5,146,712 | A * | 9/1992 | Hlavaty | E05F 15/655 49/118 |
| 5,319,990 | A * | 6/1994 | Veale | B23Q 5/404 49/362 |
| 5,826,377 | A * | 10/1998 | Simson | E05D 15/0656 49/362 |
| 5,949,681 | A * | 9/1999 | Asai | H05K 13/021 29/760 |
| 6,038,819 | A * | 3/2000 | Klein | E05F 15/652 49/362 |
| 7,410,201 | B1 * | 8/2008 | Wilson | E05F 15/652 49/362 |
| 8,474,186 | B2 * | 7/2013 | Dufour | B60J 1/1853 49/362 |
| 8,562,063 | B2 * | 10/2013 | Giret | E05D 15/1047 296/146.15 |
| 8,769,872 | B2 * | 7/2014 | Maltaverne | B60J 1/16 49/210 |
| 9,464,702 | B2 * | 10/2016 | Yokoyama | F16H 25/24 |
| 9,903,148 | B2 * | 2/2018 | Rodems | E05F 15/652 |
| 11,035,166 | B2 * | 6/2021 | Demele | E05F 15/652 |
| 11,668,129 | B2 * | 6/2023 | Singh | E05F 7/04 49/362 |
| 11,952,820 | B1 * | 4/2024 | Snider | E05F 15/655 |
| 2003/0146641 | A1 * | 8/2003 | Ruiz | B60J 1/2011 296/95.1 |
| 2005/0210749 | A1 * | 9/2005 | DuBose | E05D 15/0665 49/118 |
| 2006/0080893 | A1 * | 4/2006 | Lesle | E05F 15/652 49/413 |
| 2009/0025296 | A1 * | 1/2009 | Petner | E05F 15/652 49/130 |
| 2019/0383084 | A1 * | 12/2019 | Snider | B60J 1/1853 |
| 2020/0392778 | A1 * | 12/2020 | Houk | E05F 15/652 |
| 2023/0113049 | A1 * | 4/2023 | Alam | E05F 11/382 296/146.16 |
| 2023/0116133 | A1 * | 4/2023 | Alam | E05F 15/632 296/155 |

FOREIGN PATENT DOCUMENTS

| | | | |
|---|---|---|---|
| JP | H0420589 | U | 2/1992 |
| JP | H07232578 | A | 9/1995 |
| JP | H1162381 | A | 3/1999 |
| KR | 101491336 | B1 * | 2/2015 |
| WO | 2014/103826 | | 7/2014 |

* cited by examiner

Left ⟵⟶ Right

OPENING/CLOSING DEVICE FOR VEHICLE SLIDING-WINDOW PANEL

CROSS-REFERENCE TO RELATED APPLICATION(S)

This application claims priority to JP 2021-167467 filed Oct. 12, 2021, the entire contents of which are hereby incorporated by reference.

FIELD OF THE INVENTION

The present invention relates to an opening/closing device for a vehicle sliding-window panel which moves the sliding-window panel provided on the vehicle to open and close in a horizontal direction by a motive power of a driving source.

BACKGROUND OF THE INVENTION

WO 2014-103826 discloses an opening/closing device for a vehicle sliding-window panel which moves the sliding-window panel provided in a rear window of a pickup truck to open and close in a horizontal direction (a left-right direction) by a motive power of a driving source.

The opening/closing device for the vehicle sliding-window panel disclosed in WO 2014-103826 includes a sliding-window panel capable of opening and closing an opening part provided in a fixed panel, sliding-window-panel guide rails guiding the sliding-window panel to be movable in the horizontal direction, and a slide driving mechanism driving the sliding-window panel.

The slide driving mechanism includes a moving body coupled with the sliding-window panel, and a driving unit having a driving cable and a driving device that run the moving body along a longitudinal direction of the sliding-window-panel guide rails.

The driving cable has an inner cable running in a cylindrical outer cable. One end of the inner cable is coupled with one end of the moving body, and the other end of the inner cable is coupled with the other end of the moving body. The driving device is fixed to a vehicle body. The driving device includes a motor and runs the inner cable reciprocally by a driving force of the motor to move the moving body, and thereby moving the sliding-window panel in the horizontal direction to open and close the opening part of the fixed panel. The slide driving mechanism is fixed after the sliding-window panel is mounted on the vehicle body.

SUMMARY OF THE INVENTION

However, the opening/closing device for the vehicle sliding-window panel disclosed in Patent Literature 1 has a complex formation due to the formation including the driving cable, and has a problem which brings upsizing of an entire device because a routing space of the driving cable is required to move the sliding-window panel to open and close to a range outside the sliding-window-panel guide rails.

In view of the above disadvantages of the conventional techniques, an object of the present invention is to provide an opening/closing device for a vehicle sliding-window panel which makes it possible to downsize the entire device.

According to the present invention, the above problems are solved as follows. Namely, an opening/closing device for a vehicle sliding-window panel, includes;

a sliding-window panel opening and closing an opening part provided in a vehicle body by sliding in a horizontal direction;

upper and lower guide rails fixed to the vehicle body to support the sliding-window panel to slide in the horizontal direction; and a slide driving mechanism fixed to one guide rail either the upper or lower guide rail to operate the sliding-window panel to open and close by driving a motor:

wherein the slide driving mechanism comprises:

the motor;

a lead screw rotating around an axis parallel to a longitudinal direction of the one guide rail by driving the motor; and a screw nut which is screwed with the lead screw to linearly move in the longitudinal direction of the one guide rail by rotation of the lead screw and is coupled with the sliding-window panel to operate the sliding-window panel to open and close by the linear movement, and wherein the one guide rail is integrally formed with a first and second supporting portions which rotatably support both end portions of the lead screw respectively.

According to the opening/closing device of the present invention for a vehicle sliding-window panel, since a lead screw of a slide driving mechanism is directly supported to guide rails in a rotatable manner, it is possible to simplify a formation and downsize the device.

EMBODIMENTS OF THE INVENTION

The present invention is explained by referring to an embodiment on the basis of the drawings as follows. However, the present invention is not limited to the following embodiment, and proper changes and modifications may be added to the following embodiment within an obvious scope to a person skilled in the art.

Figure 1:
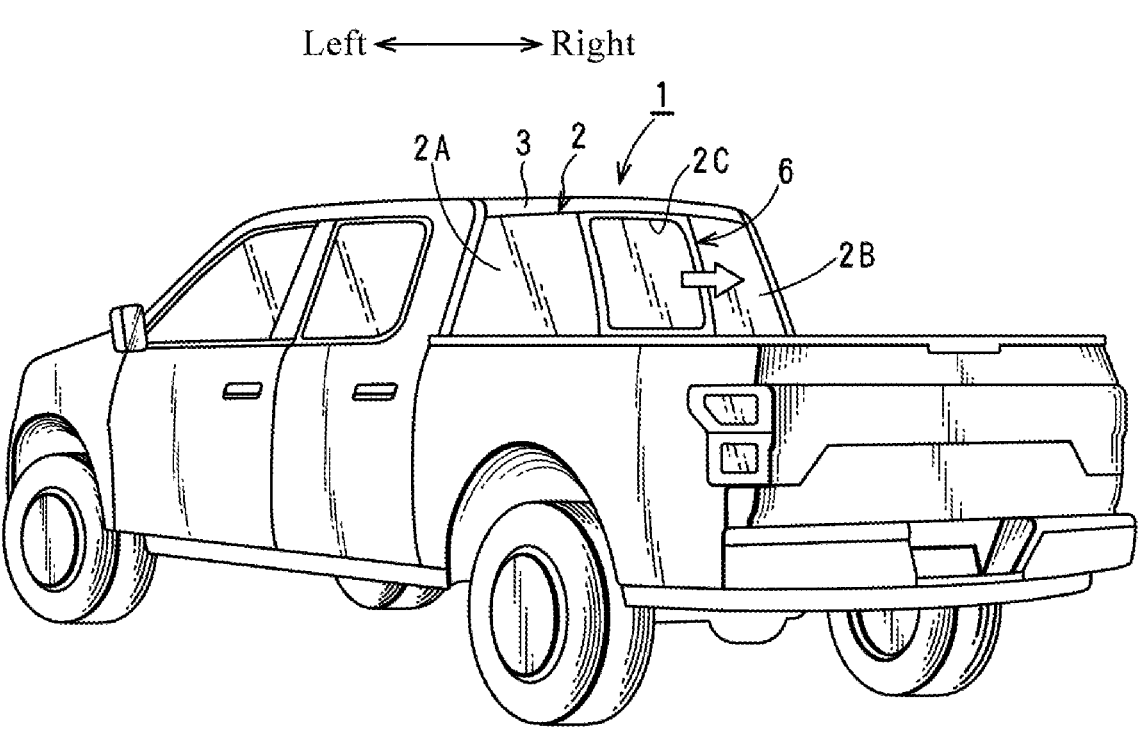
FIG. 1 is a perspective view showing a vehicle on which an opening/closing device of the present invention for a vehicle sliding-window panel is mounted, viewed from an obliquely rearward left direction.
Figure 2:
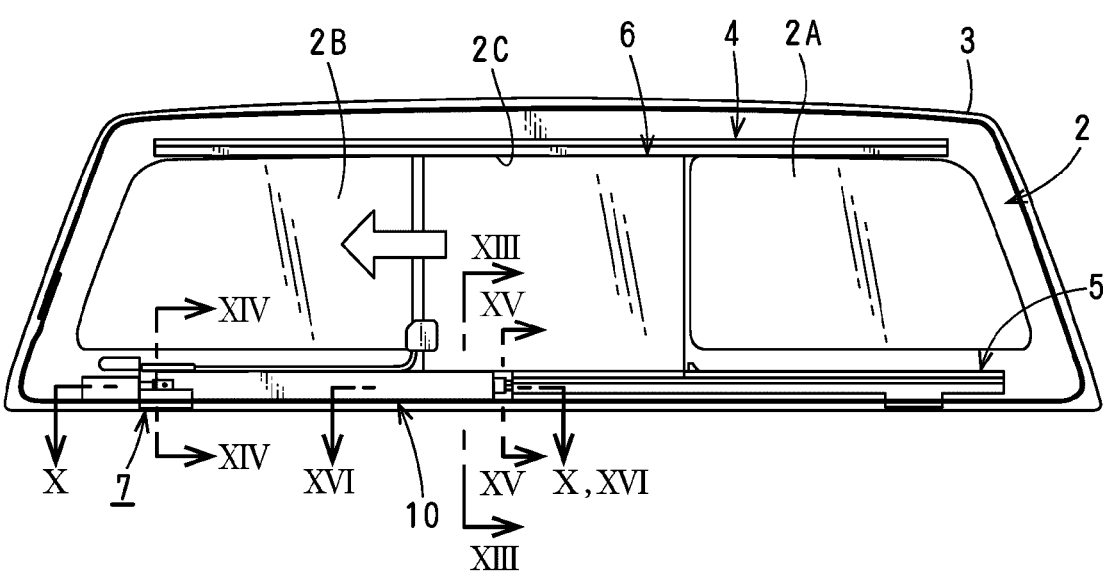
FIG. 2 is a front elevational view showing the opening/closing device for the vehicle sliding-window panel, viewed from a front side.
Figure 3:
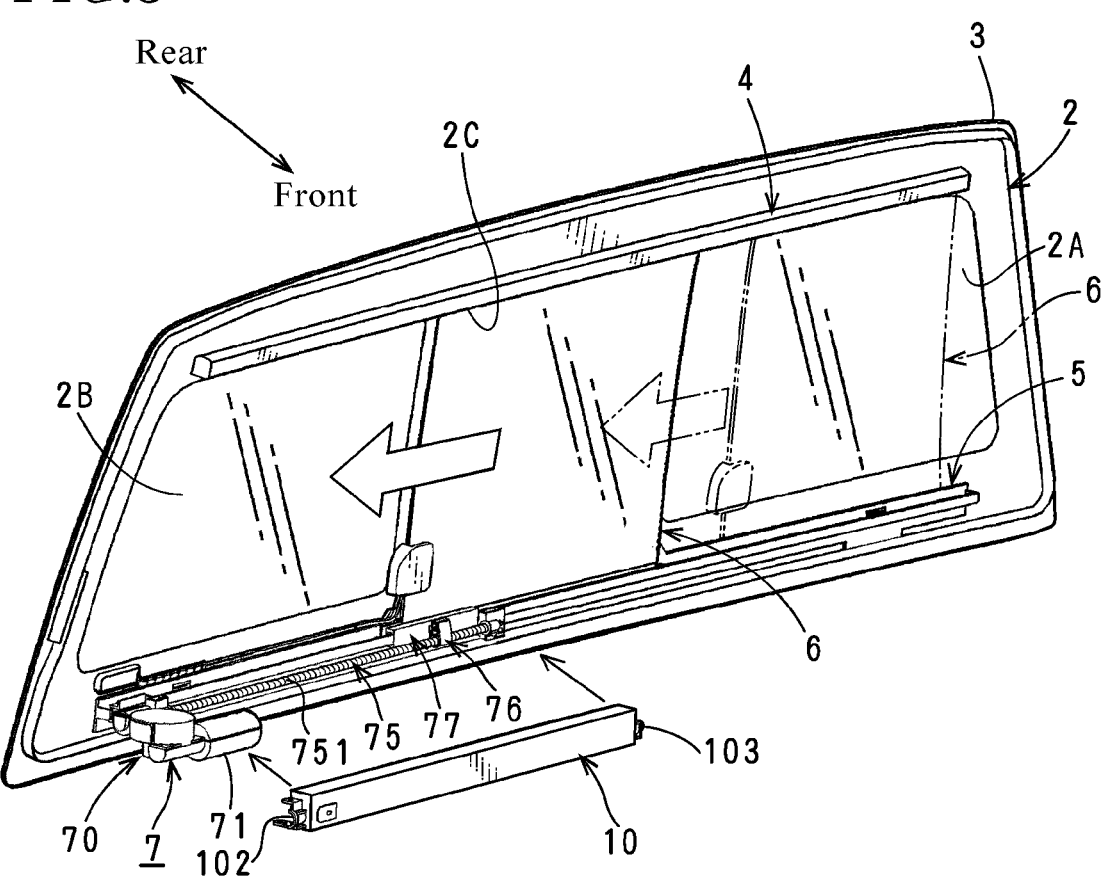
FIG. 3 is a perspective view showing the opening/closing device for the vehicle sliding-window panel, viewed from an obliquely frontward direction.
Figure 4:
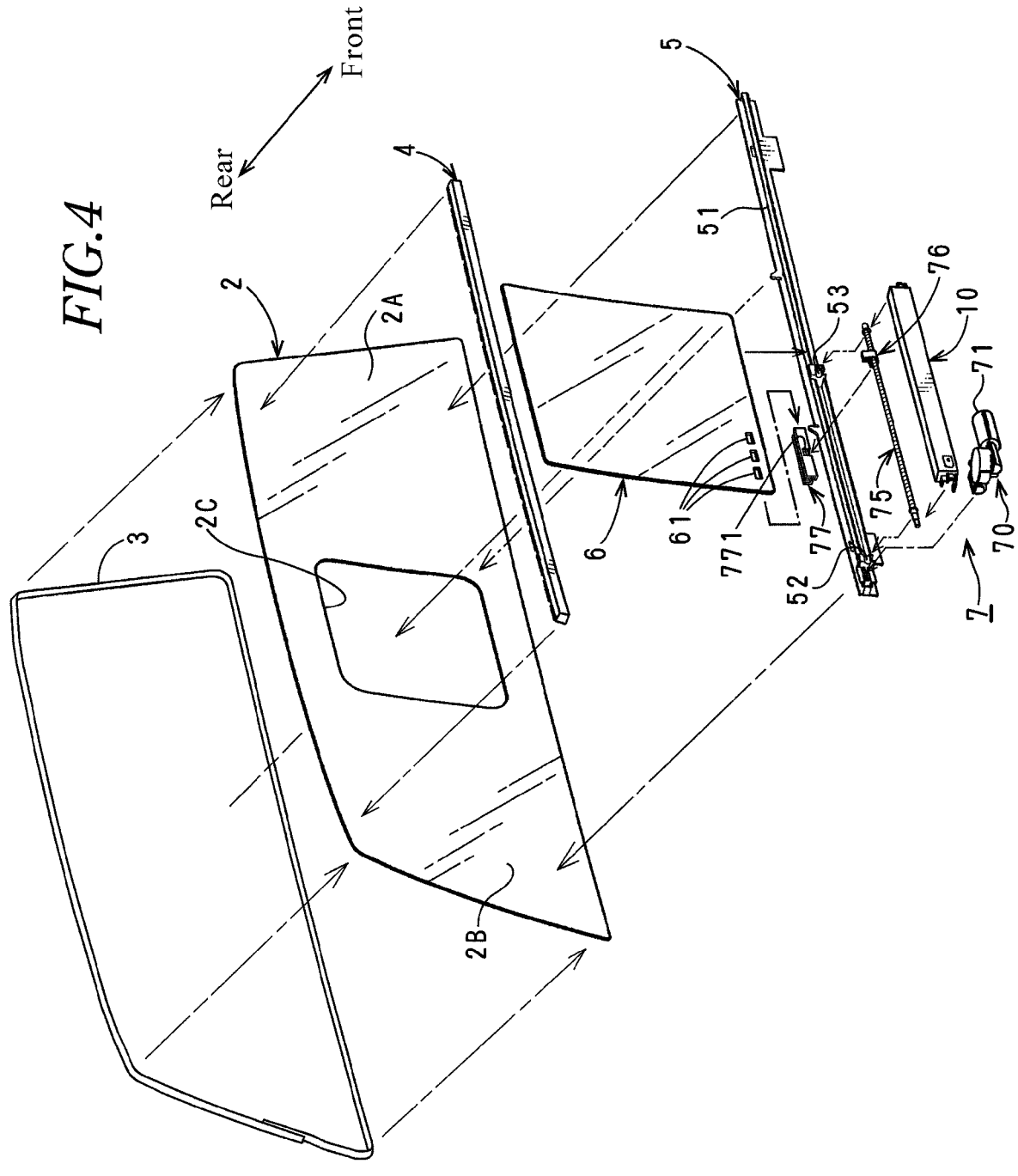
FIG. 4 is an exploded perspective view showing the opening/closing device for the vehicle sliding-window panel.
Figure 5:
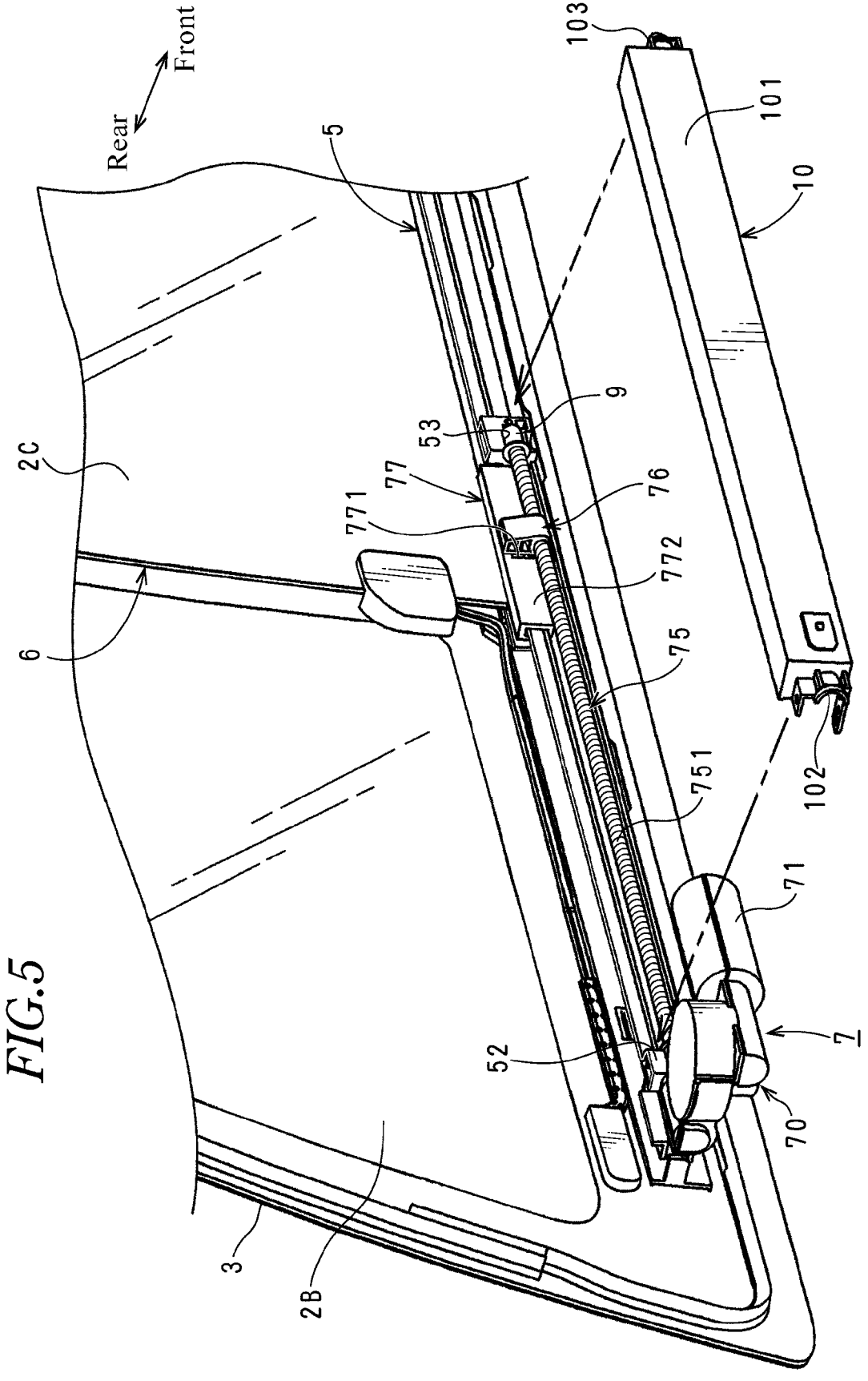
FIG. 5 is an enlarged perspective view showing a principal part of the opening/closing device for the vehicle sliding-window panel, viewed from the obliquely frontward direction.

FIG. 1 is a perspective view showing a vehicle on which an opening/closing device of the present invention for a vehicle sliding-window panel is mounted, viewed from an obliquely rearward left direction. FIG. 2 is a front elevational view showing the opening/closing device for the vehicle sliding-window panel, viewed from a front side. FIG. 3 is a perspective view showing the opening/closing device for the vehicle sliding-window panel, viewed from an obliquely frontward direction. FIG. 4 is an exploded perspective view showing the opening/closing device for the vehicle sliding-window panel. FIG. 5 is an enlarged perspective view showing a principal part of the opening/closing device for the vehicle sliding-window panel, viewed from the obliquely frontward direction. Incidentally, directions used in the following explanation are based on front-rear and left-right directions of the vehicle 1.

Thus, for example, in FIGS. 2, 3, a left direction in the drawings indicates a right direction of the vehicle 1, and a right direction in the drawings indicates a left direction of the vehicle 1.

The opening/closing device for the vehicle sliding-window panel of the present embodiment has a structure for opening and closing a rear window part (an opening part) 2C provided on a rear part of a driver's cab of the vehicle 1 such as a pickup truck. As main components, the opening/closing device includes a fixed panel (glass) 2 fixed to a rear window frame body 3 of the rear part of the driver's cab, an upper guide rail 4 fixed to an upper portion of a front face in an interior side of the fixed panel 2 such that its longitudinal direction is oriented to the left-right direction (a horizontal direction), a lower guide rail 5 fixed to a lower portion of the front face of the fixed panel 2 such that its longitudinal direction is oriented to the left-right direction, a sliding-window panel (glass) 6 slidably fixed in the left-right direction by the upper and lower guide rails 4, 5 to open and close the above-described rear window part 2C formed in the fixed panel 2, and a slide driving mechanism 7 driving the sliding-window panel 6 in an opening/closing direction (the left-right direction).

Understandable particularly from FIG. 4, the fixed panel 2 is integrally formed with a first fixed panel 2A on a left side (a right side in FIG. 4) and a second fixed panel 2B on a right side (a left side in FIG. 4) which are provided with a predetermined gap in the left-right direction between them, and the rear window part 2C formed in a rectangular shape and provided between the first and second fixed panels 2A, 2B.

The sliding-window panel 6 is formed in a rectangular shape in a front view, its upper edge portion is slidably fitted to the upper guide rail 4 in the left-right direction, and its lower edge portion is slidably fitted to the lower guide rail

5 in the left-right direction by a carrier plate 77 described below, whereby the sliding-window panel 6 slidably moves by a predetermined distance in an arrow direction shown in FIGS. 2. 3 (in FIG. 3, a direction indicated by an arrow shown by a solid line rather than an arrow shown by a two-dot chain line) from a closing position for closing the rear window part 2C (for example, a position shown in FIGS. 2, 3) to an opening position for opening the rear window part 2C. The sliding-window panel 6 is provided with a plurality of engaging holes 61 side by side in the left-right direction on its lower portion, and the engaging holes 61 respectively engage with engaging protrusion portions 775 provided on the carrier plate 77 as described below.

The slidable movement of the sliding-window panel 6 from the closing position to the opening position and vice versa is carried out by a linear movement of a screw nut 76 driven by a motor 72 described below of the slide driving mechanism 7.

The upper guide rail 4 has a guide groove not shown to which the upper edge portion of the sliding-window panel 6 is slidably fitted in the left-right direction, has a vertical cross-section formed in an inverted U-like shape, and is fixed to the upper portion of the front face of the fixed panel 2 such that its longitudinal direction is oriented to the left-right direction. Preferably, when the sliding-window panel 6 is fixed to the rear part of the driver's cab, a left end of the guide groove is opened such that a right upper-end portion of the sliding-window panel 6 can be inserted into the guide groove of the upper guide rail 4 from the left end of the upper guide rail 4. Incidentally, the upper guide rail 4 is formed in a curved shape to be slightly curved rearward in a plane view.

The lower guide rail 5 is made of a synthetic resin, is formed in a curved shape to be slightly curved rearward in the plane view in the same way as the upper guide rail 4, and is fixed to the lower portion of the front face of the fixed panel 2 such that its longitudinal direction is oriented to the left-right direction. The lower guide rail 5 is formed with a guide groove 51 to which the carrier plate 77 is slidably fitted in the left-right direction, wherein the carrier plate 77 is coupled with the lower edge portion of the sliding-window panel 6 as described below. Particularly shown in FIG. 13, the guide groove 51 is open upward such that the carrier plate 77 can slidably fit it from above. A left end of the guide groove 51 is opened such that a right lower end portion of the sliding-window panel 6 can be inserted into the guide groove 51 of the lower guide rail 5 from a left end of the lower guide rail 5 when the sliding-window panel 6 is fixed to the rear part of the driver's cab.

A first supporting portion 52 rotatably supporting one end portion (a right end portion) 752 of a lead screw 75 of the slide driving mechanism 7 is integrally formed with one end portion (a right end portion) of the lower guide rail 5. Moreover, a second supporting portion 53 rotatably supporting the other end portion (a left end portion) of the lead screw 75 is integrally formed with an approximately central portion in the longitudinal direction of the lower guide rail 5.

Figures 7, 8:
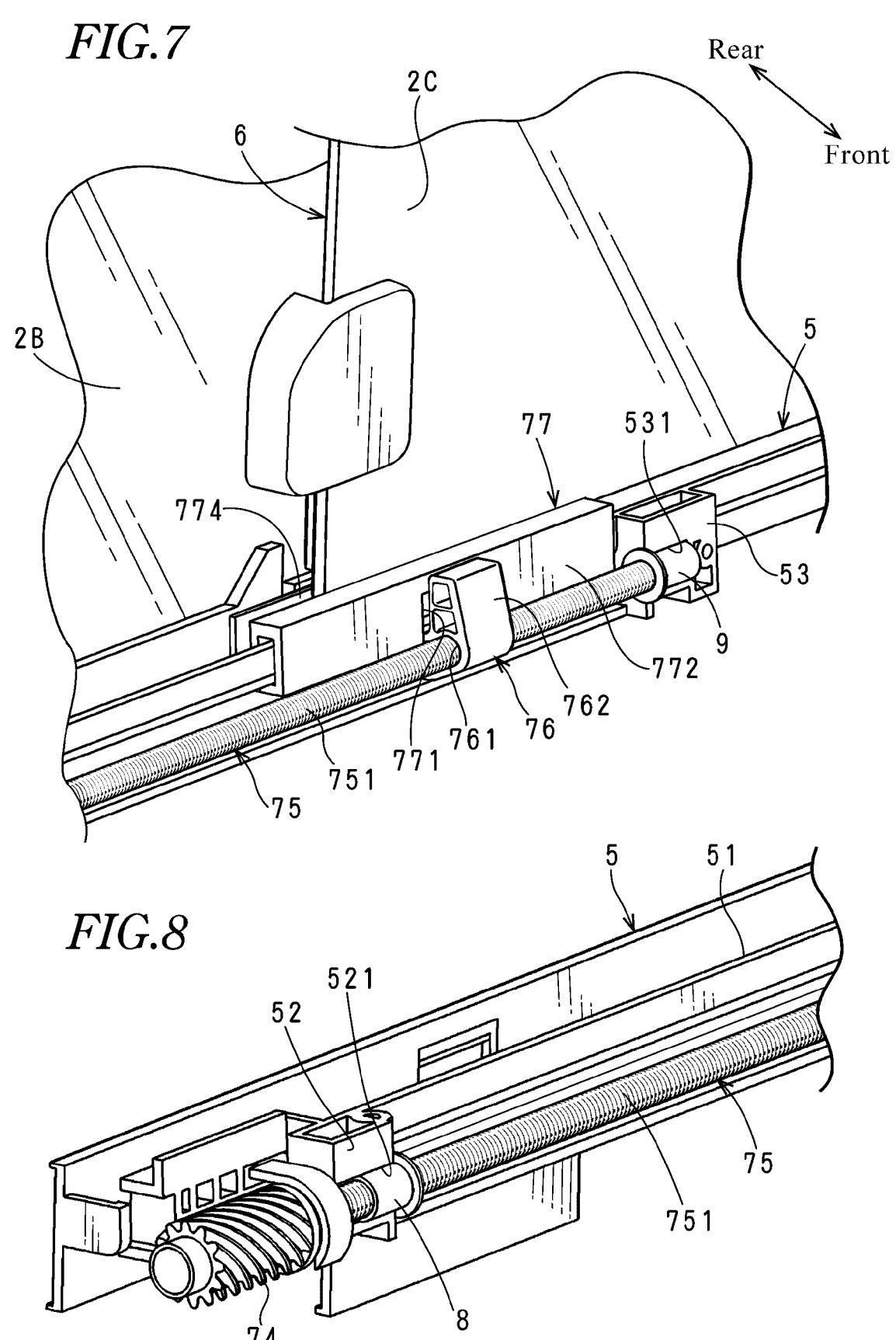
FIG. 7 is a perspective view showing a principal part including the carrier plate and a second sliding bearing.
FIG. 8 is an enlarged perspective view showing a principal part including a first supporting portion and one end portion of a lead screw.
Figure 11:
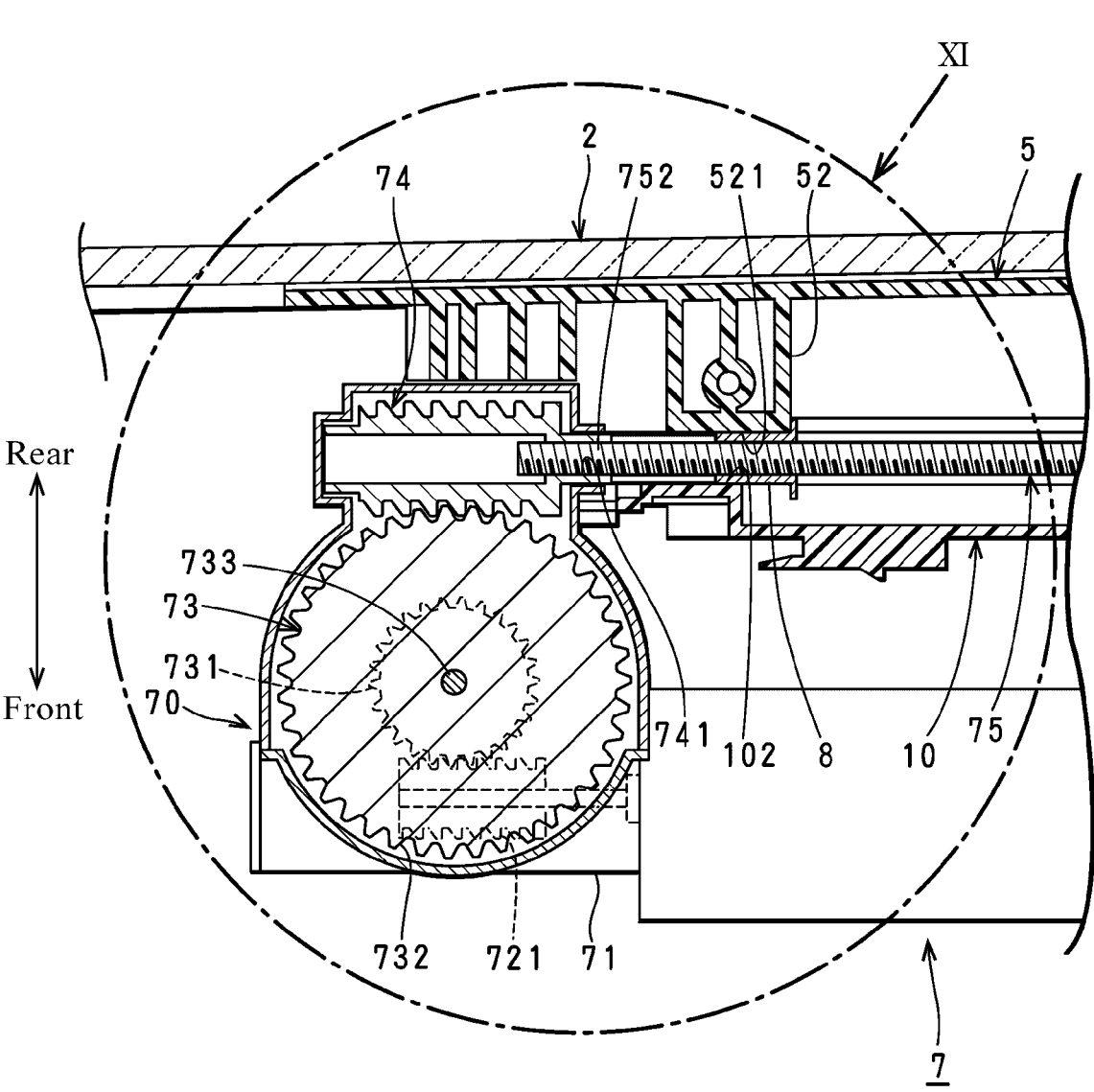
FIG. 11 is an enlarged view showing a part indicated by the arrow XI in FIG. 10.
Figure 14:
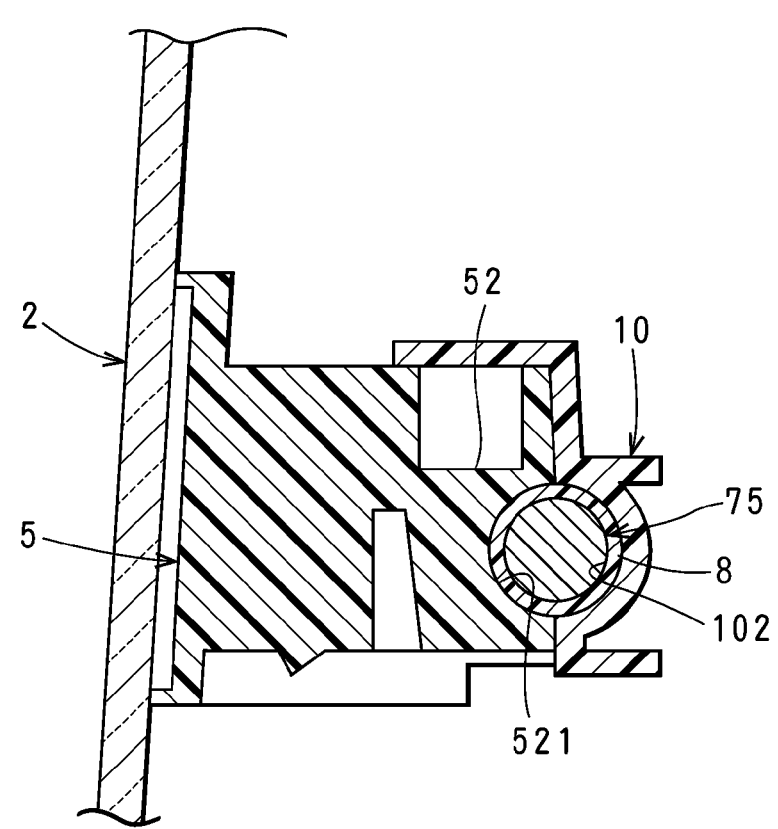
FIG. 14 is a vertical cross-sectional view taken along the line XIV-XIV in FIG. 2.
Figure 15:
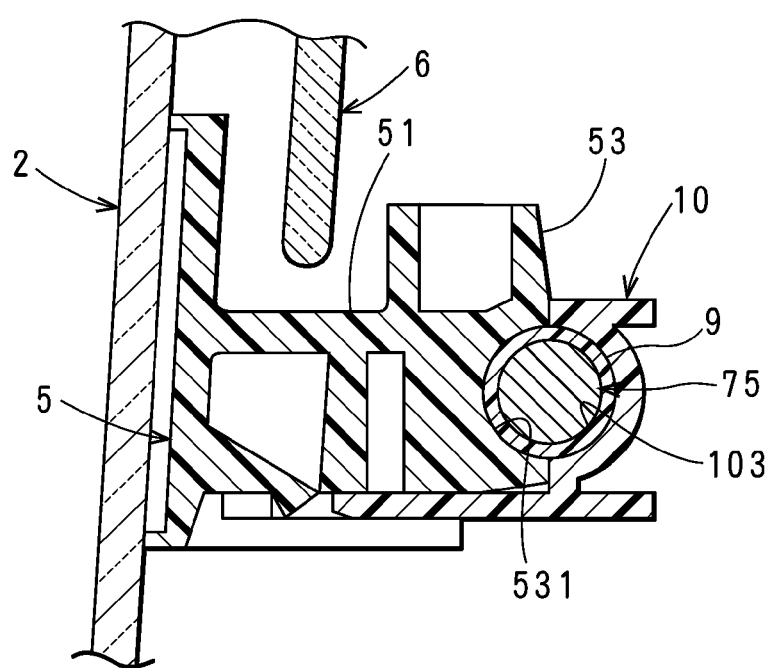
FIG. 15 is a vertical cross-sectional view taken along the line XV-XV in FIG. 2.

Particularly shown in FIGS. 8, 11, 14, the first supporting portion 52 has a supporting groove 521 which is formed to have a vertical cross-section in a semicircular shape and is open forward and extended in the left-right direction. Particularly shown in FIGS. 7, 12, 15, the second supporting portion 53 has a supporting groove 531 which is formed to have a vertical cross-section in a semicircular shape and is open forward and extended in one direction (the right direction).

Figure 9:
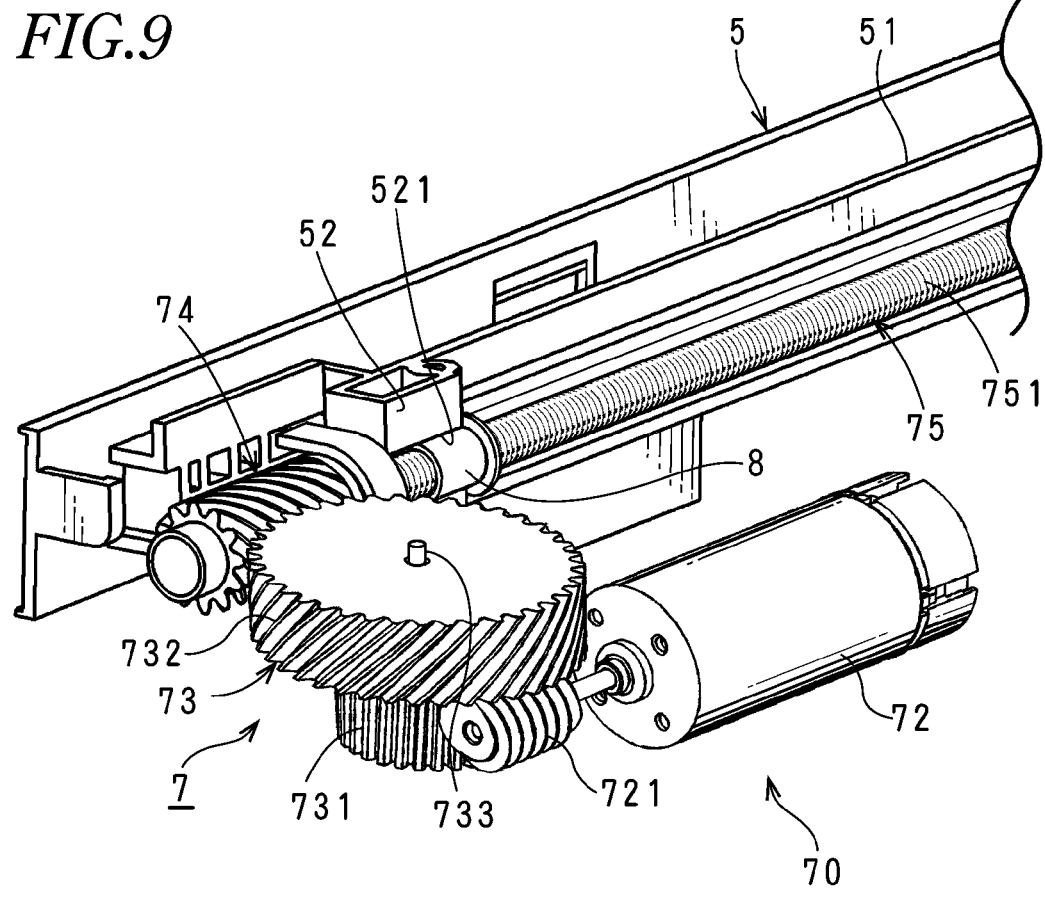
FIG. 9 is a perspective view showing an internal structure of a slide driving mechanism.

Particularly shown in FIGS. 5, 9, 11, the slide driving mechanism 7 includes a driving part 70, the lead screw 75 rotating around an axis oriented in the left-right direction (horizontal direction) by driving the motor 72 of the driving part 70, the screw nut 76 screwed onto the lead screw 75, the carrier plate 77 coupling the screw nut 76 with the sliding-window panel 6, and a cover 10 veiling the lead screw 75.

The driving part 70 includes a casing 71 fixed to the one end portion of the lower guide rail 5, the motor 72 mounted in the casing 71, and a first and second reduction gears 73, 74 which are pivotally supported in a rotatable manner respectively in the casing 71.

The motor 72 is mounted in the casing 71 such that its rotating shaft is oriented in the left-right direction (the horizontal direction), and a worm 721 is fixed on one end portion of the rotating shaft. The worm 721 is engaged with a worm wheel gear part 731 having a small diameter of the first reduction gear 73 to transmit rotation of the motor 72 to the first reduction gear 73.

The first reduction gear 73 is constructed by integrally forming the above-described worm wheel gear part 731 engaged with the worm 721 and a large-diameter gear 732 engaged with the second reduction gear 74 on the same axis, and is rotatably supported by a vertical shaft 733 in the casing 71.

The second reduction gear 74 is rotatably supported by a shaft in the left-right direction (the direction parallel with the rotating shaft of the motor 72) in the casing 71, is engaged with the large-diameter gear 732 of the first reduction gear 73 to rotate around an axis oriented to the left-right direction in conjunction with the rotation of the first reduction gear 73, and thereby transmitting the rotation to the lead screw 75. Preferably, the second reduction gear 74 is positioned on the opposite side of the worm 721 across the shaft 733 of the first reduction gear 73 to engage with the large-diameter gear 732. A coupling hole 741 (see FIG. 11) to which one end portion 752 of the lead screw 75 is unrotatably fitted is provided in one end portion (a right end portion) of the second reduction gear 74. According to such a configuration, it is possible to downsize the driving part 70.

Figure 10:
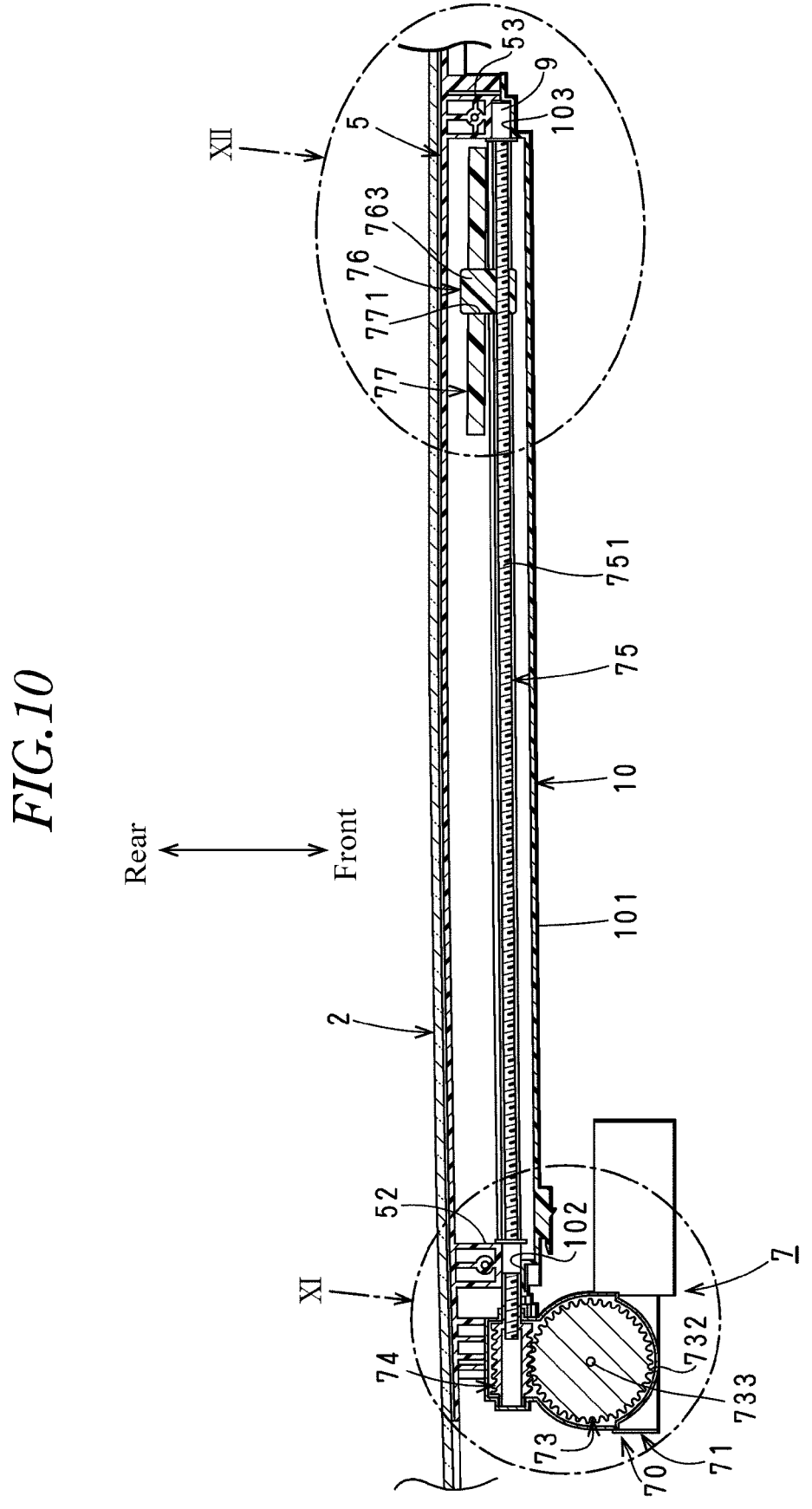
FIG. 10 is a transverse cross-sectional view taken along the line X-X in FIG. 2.

Particularly shown in FIG. 10, a vicinity of the one end portion 752 of the lead screw 75 is rotatably supported to the first supporting portion 52 of the lower guide rail 5, and the other end portion thereof is rotatably supported to the second supporting portion 53 of the lower guide rail 5. Preferably, particularly shown in FIG. 11, the vicinity of the one end portion 752 of the lead screw 75 is rotatably supported by inserting into a first sliding bearing 8 which is fittingly supported to the supporting groove 521 provided in the first supporting portion 52. Particularly shown in FIG. 12, the other end portion of the lead screw 75 is rotatably supported by inserting into a second sliding bearing 9 which is fittingly supported to the supporting groove 531 provided in the second supporting portion 53. Moreover, preferably, a peripheral surface of the first sliding bearing 8 is interposed between a first holding portion 102 provided on one end portion of the cover 10 fixed to the lower guide rail 5 and the supporting groove 521 of the first supporting portion 52. A peripheral surface of the second sliding bearing 9 is interposed between a second holding portion 103 provided on the other end portion of the cover 10 and the supporting groove 531 of the second supporting portion 53. Namely, the one end portion 752 of the lead screw 75 is rotatably supported by the first sliding bearing 8 which is supported between the first supporting portion 52 of the lower guide rail 5 and the first holding portion 102 of the cover 10, and the other end portion of the lead screw 75 is rotatably supported by the second sliding bearing 9 which is supported between the second supporting portion 53 of the lower guide rail 5 and the second holding portion 103 of the cover 10. According to such a configuration, both end portions of the lead screw 75 can be supported to be capable of rotating smoothly, the lead screw 75 is veiled by the cover 10 to prevent the lead screw 75 from dust attaching, and a stable operation can be implemented.

As shown in FIG. 11, the one end portion 752 of the lead screw 75 goes through the first sliding bearing 8 as described above to be unrotatably inserted into the coupling hole 741 of the second reduction gear 74. Thus, the lead screw 75 rotates around the axis in the left-right direction by rotation of the second reduction gear 74.

Figure 6:
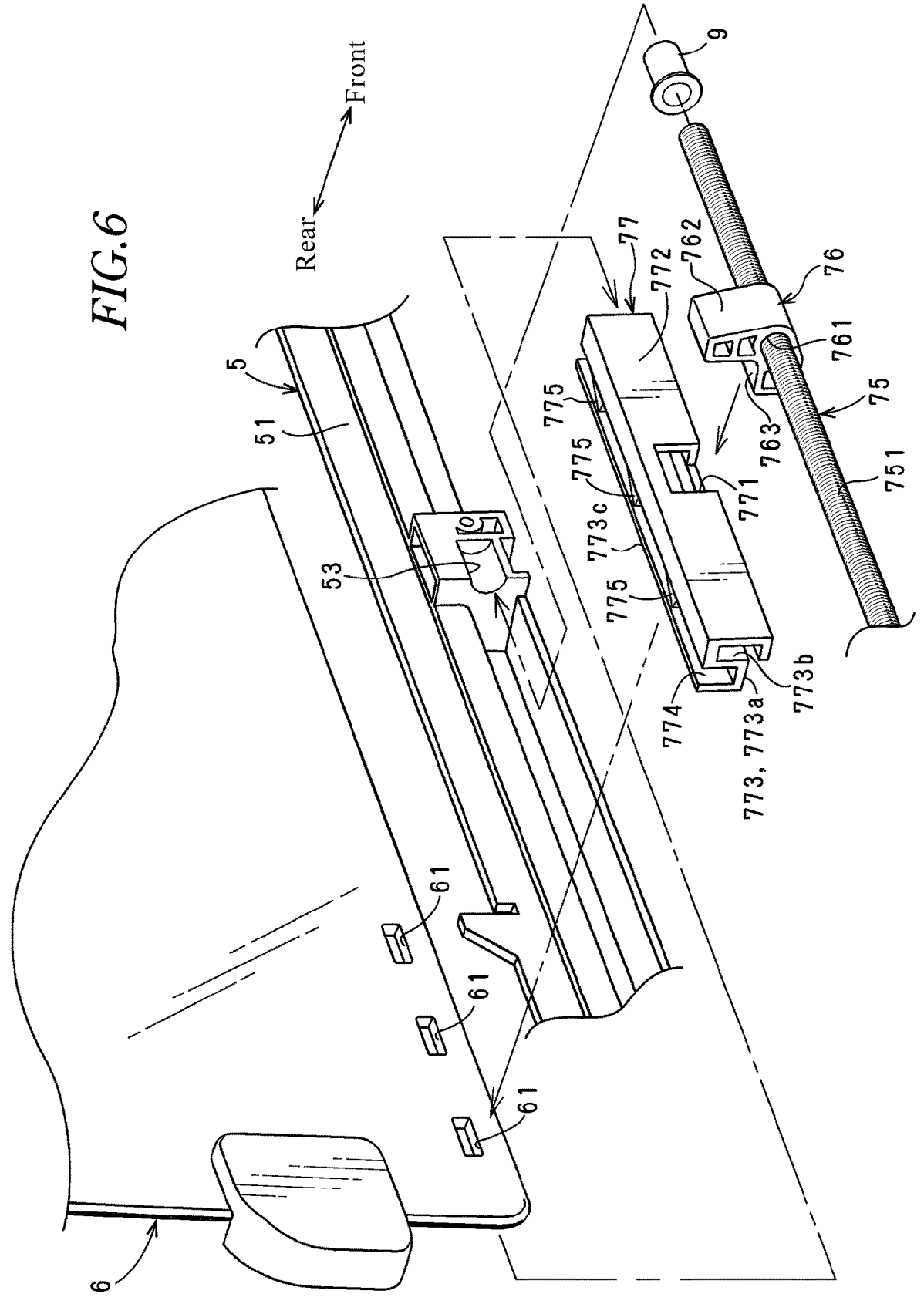
FIG. 6 is an exploded perspective view showing a principal part including a carrier plate.
Figure 12:
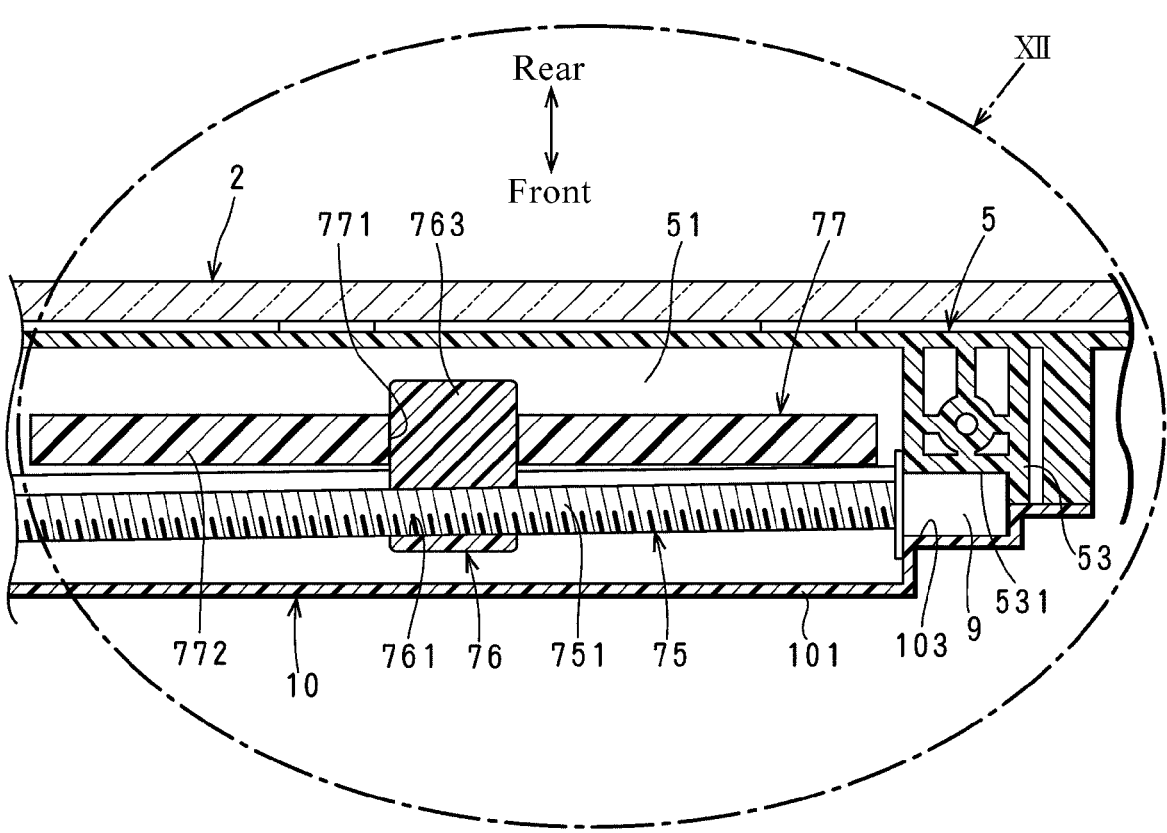
FIG. 12 is an enlarged view showing a part indicated by the arrow XII in FIG. 10.
Figure 13:
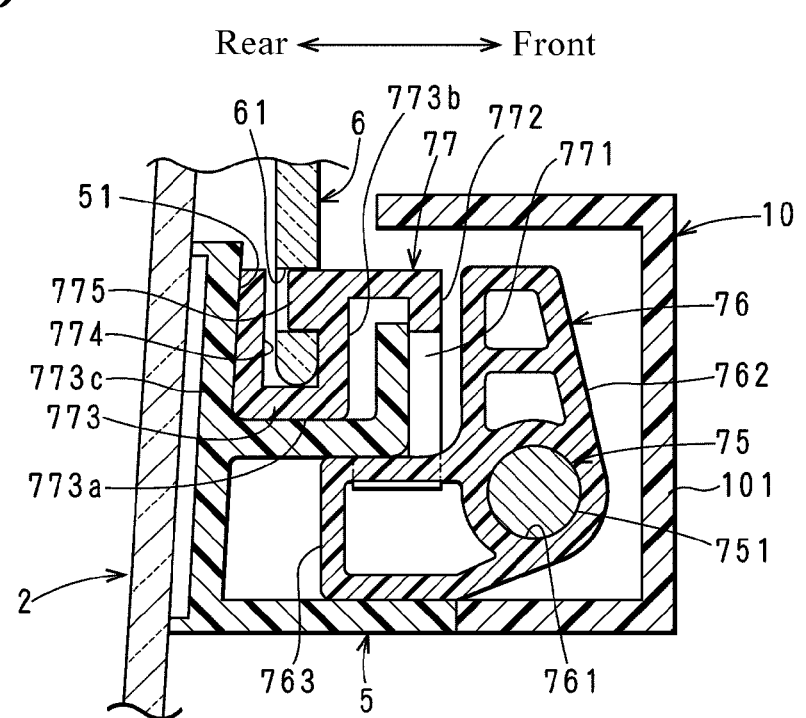
FIG. 13 is a vertical cross-sectional view taken along the line XIII-XIII in FIG. 2.

Particularly shown in FIG. 12, the lead screw 75 goes through a screw hole 761 perforating the screw nut 76 in the left-right direction such that a screw portion 751 of the lead screw 75 screws with the screw hole 761, and thus the screw nut 76 linearly moves in the left-right direction by the rotation of the lead screw 75. Moreover, as shown in FIGS. 6, 13, the screw nut 76 is formed in an L-like shape in a side view, and is constructed by integrally forming an upper arm portion 762 extending upward and a coupling arm portion 763 extending rearward for fitting to a coupling groove 771 provided in the carrier plate 77, in addition to the screw hole 761. In this way, the screw nut 76 is coupled with the carrier plate 77 by fitting the coupling arm portion 763 to the coupling groove 771 of the carrier plate 77, and thereby moving the carrier plate 77 in the left-right direction.

The carrier plate 77 is made of a synthetic resin, is formed to have a predetermined length in the left-right direction, is connected with the lower portion of the sliding-window panel 6 and the screw nut 76, and thus slidably moves along with the longitudinal direction of the lower guide rail 5 and moves the sliding-window panel 6 to open and close, according to the linear movement of the screw nut 76 in the left-right direction by the rotation of the lead screw 75.

Particularly shown in FIGS. 6, 13, the carrier plate 77 is formed with a vertical wall portion 772 positioned in a front side of the guide groove 51 of the lower guide rail 5 and having a predetermined length in the left-right direction, the above-described coupling groove 771 to which the coupling arm portion 763 of the screw nut 76 is fitted, and a sliding portion 773 having a vertical cross-section formed in a U-like shape and slidably fitted to the guide groove 51 of the lower guide rail 5 in the left-right direction.

Particularly shown in FIGS. 6, 12, the coupling groove 771 of the carrier plate 77 is provided at an approximately central portion in the longitudinal direction of the vertical wall portion 772 to have a rectangular shape open forward and downward, and has a formation in which the coupling arm portion 763 of the screw nut 76 is capable of fitting to it. Thus, the carrier plate 77 is coupled with the screw nut 76 by fitting the coupling arm portion 763 to the coupling groove 771, and moves with the screw nut 76 in the left-right direction.

Preferably, the coupling arm portion 763 of the screw nut 76 is fitted to the coupling groove 771 of the carrier plate 77 to be capable of relatively moving in the front-rear direction without substantially generating looseness in the left-right direction.

As described above, fitting the coupling arm portion 763 of the screw nut 76 to the coupling groove 771 of the carrier plate 77 produces the following effects.

(a) When the screw nut 76 linearly moves by the rotation of the lead screw 75, it is possible to surely transmit this linear movement to the carrier plate 77.

(b) Even when the lower guide rail 5 is formed in a rearward curved shape such that a gap in the front-rear direction between the carrier plate 77 and the screw nut 76 changes according to the movement of the carrier plate 77 in the left-right direction, it is possible to smooth the movement of the screw nut 76 and the carrier plate 77 in the left-right direction by absorbing the change of the gap because the coupling arm portion 763 of the screw nut 76 is capable of relatively moving to the coupling groove 771 of the carrier plate 77 in the front-rear direction.

Figure 16:
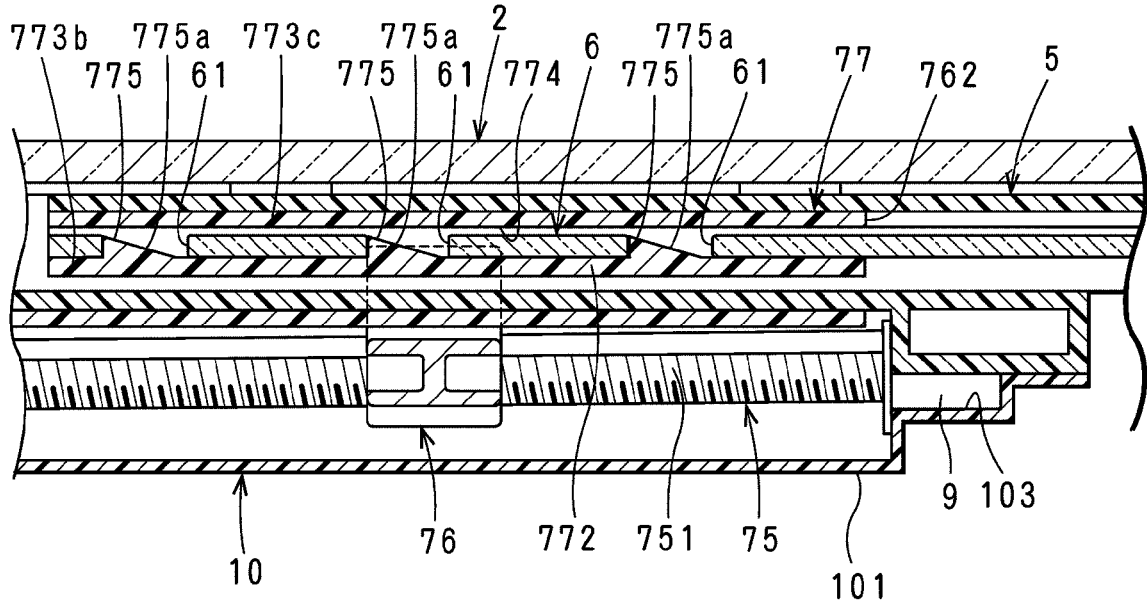
FIG. 16 is a transverse cross-sectional view taken along the line XVI-XVI in FIG. 2.

Particularly shown in FIGS. 6, 13, 16, the sliding portion 773 of the carrier plate 77 has a bottom portion 773*a* sliding on the guide groove 51 of the lower guide rail 5, a first raised portion 773*b* rising from a front end of the bottom portion 773*a*, and a second raised portion 773*c* rising from a rear end of the bottom portion 773*a* to face the first raised portion 773*b* with a predetermined gap.

A fitting groove 774 is provided between the first and second raised portions 773*b*, 773*c*, wherein the fitting groove 774 is open upward to be capable of interposing the lower portion of the sliding-window panel 6, and an end in the longitudinal direction thereof is open. Thus, since the end in the longitudinal direction of the fitting groove 774 is open, when the sliding-window panel 6 is fixed to the vehicle 1, it is possible to fit the lower portion of the sliding-window panel 6 to the fitting groove 774 of the carrier plate 77 by only moving the sliding-window panel 6 in the horizontal direction.

The engaging protrusion portions (engaging portions) 775 respectively engage with the engaging holes 61 provided on the lower portion of the sliding-window panel 6 are provided on an inner side surface (a surface facing the second raised portion 773*c*) of the first raised portion 773*b*. Understandable particularly from FIG. 16, preferably, each of the engaging protrusion portions 775 is formed in a right triangle shape having an inclined surface 775*a* inclined to the other side (the side opposite to a fixing direction of the sliding-window panel 6) in the plane view so as to engage with the engaging holes (engaged portions) 61 of the sliding-window panel 6. Since the engaging protrusion portions 775 are respectively formed in a right triangle shape in the plane view, when the sliding-window panel 6 is coupled with the carrier plate 77, it is possible to easily and surely engage the engaging protrusion portions 775 with the engaging holes 61 respectively by inserting the lower portion of the sliding-window panel 6 into the fitting groove 774 of the carrier plate 77 from a left side.

Moreover, preferably, at least one of the first and second raised portions 773*b*, 773*c* is formed to be capable of elastically deforming in an outer direction (a direction in which the width of the fitting groove 774 is increased) such that the engaging protrusion portions 775 are easily engaged with the engaging holes 61 respectively when the lower portion of the sliding-window panel 6 is inserted into the fitting groove 774 of the carrier plate 77 from the left side to engage the engaging protrusion portions 775 with the engaging holes 61 respectively.

The cover 10 is fixed to the lower guide rail 5 to entirely veil the lead screw 75. The cover 10 is formed with a covering portion 101 veiling the lead screw 75, the first holding portion 102 provided on an end of the covering portion 101 to rotatably supporting the vicinity of the one end portion 752 of the lead screw 75 through the first sliding bearing 8 together with the first supporting portion 52 of the lower guide rail 5, and the second holding portion 103 provided on the other end of the covering portion 101 to rotatably supporting the other end portion of the lead screw 75 through the second sliding bearing 9 together with the second supporting portion 53 of the lower guide rail 5.

Next, a method for fixing the sliding-window panel 6 to the vehicle 1 is explained. At first, the lower portion on one end side of the sliding-window panel 6 is inserted into the guide groove 51 of the lower guide rail 5 fixed to the fixed panel 2 from the other end side, the upper portion of the sliding-window panel 6 is aligned with the guide groove of the upper guide rail 4, and the upper portion in the one end side of sliding-window panel 6 is inserted into the guide groove of the upper guide rail 4 fixed to the fixed panel 2 from the other end side. Incidentally, the slide driving mechanism 7 is fixed to the lower guide rail 5 before the sliding-window panel 6 is fixed to the vehicle 1.

Figure 17:
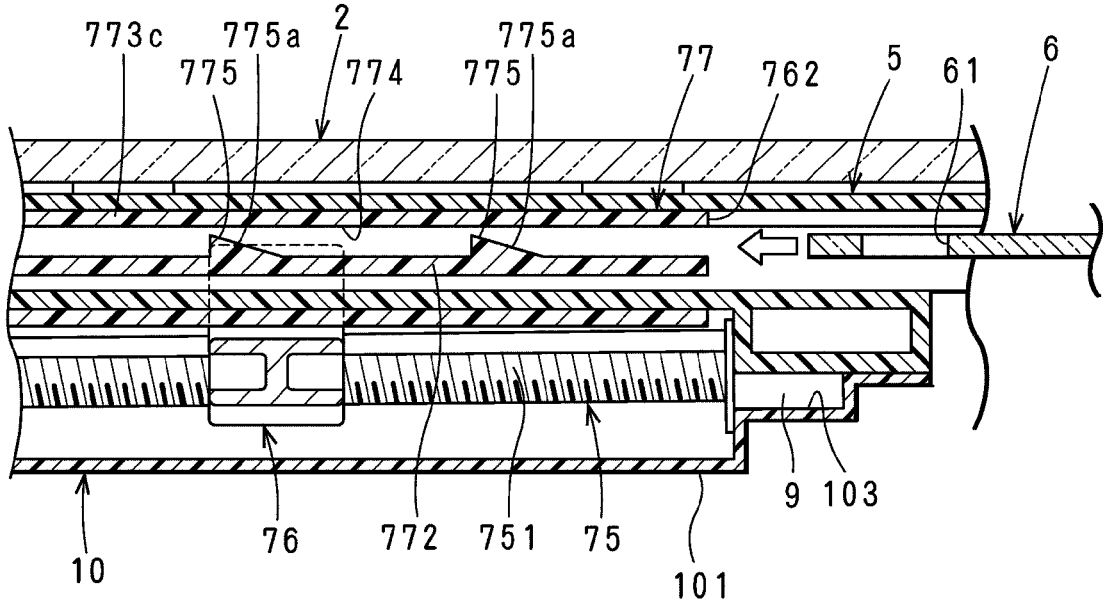
FIG. 17 is a transverse cross-sectional view showing the same part shown in FIG. 16 for describing a method for fitting the sliding-window panel.

Next, the sliding-window panel 6 is lifted slightly and is horizontally moved to the carrier plate 77 coupled with the screw nut 76. Then, as shown in FIG. 17, the sliding-window panel 6 is moved in an arrow direction, and the lower portion on the one end side of the sliding-window panel 6 is fitted to the fitting groove 774 of the carrier plate 77 from the horizontal direction.

Next, the sliding-window panel 6 is moved by a predetermined distance in one direction in a state where the lower portion on the one end side of the sliding-window panel 6 is fitted to the fitting groove 774 of the carrier plate 77, and thereby respectively engaging the engaging protrusion portions 775 of the carrier plate 77 with the engaging holes 61 of the sliding-window panel 6. Accordingly, the sliding-window panel 6 is coupled with the carrier plate 77.

As described above, since the end in the longitudinal direction (the horizontal direction) of the fitting groove 774 of the carrier plate 77 is open such that the lower portion of the sliding-window panel 6 can be fitted to the fitting groove 774 of the carrier plate 77 from the horizontal direction, when the sliding-window panel 6 is fixed to the vehicle 1, without considerably lifting the sliding-window panel 6 inserted between the upper and lower guide rails 4, 5, it is possible to fit the lower portion of the sliding-window panel 6 to the fitting groove 774 of the carrier plate 77 by moving the sliding-window panel 6 to the carrier plate 77 as it is. Accordingly, the coupling operation of the sliding-window panel 6 with the carrier plate 77 is made to be easy and it is possible to increase operational efficiency.

When the screw nut 76 is linearly moved by rotating the lead screw 75 driven by the motor 72 of the slide driving mechanism 7, the sliding-window panel 6 fixed as described above is moved to open and close by the movement of the carrier plate 77 coupled with the screw nut 76.

As described above, the foregoing relates to one embodiment of the present invention, but the present invention is not limited to the above embodiment and various changes and modifications may be added to the present embodiment without departing from the gist of the present invention as follows.

(a) The lead screw 75 is rotatably supported to a supporting portion provided on the upper guide rail 4, and the slide driving mechanism 7 is fixed to the upper guide rail 4.

(b) The upper guide rail 4 and/or the lower guide rail 5 is directly fixed to a vehicle body. Incidentally, also regarding said embodiment, it is defined that the upper and lower guide rails 4, 5 are fixed to the vehicle body because they are indirectly fixed to the vehicle body through the fixed panel 2 fixed to the vehicle body.

(c) The screw nut 76 is directly coupling with the sliding-window panel 6.

(d) Regarding a structure for fixing the carrier plate 77 to the sliding-window panel 6, an engaging hole or an engaging groove is provided on either the carrier plate 77 or the sliding-window panel 6, and a protruding portion engaging with the engaging hole or the engaging groove is provided on the other of the carrier plate 77 or the sliding-window panel 6. Incidentally, when the protruding portion is provided on the sliding-window panel side, an inclined surface of the protruding portion is formed to be inclined to the fixing direction of the sliding-window panel 6.

(e) Regarding the ends in the longitudinal direction of the fitting groove 774 of the carrier plate 77, only the end on a side (the left side) facing the fixing direction of the sliding-window panel 6 is opened, and the other end (the right side) is closed.

What is claimed is:

1. An opening/closing device for a vehicle sliding-window panel, comprising:

a sliding-window panel configured for opening and closing an opening part provided in a vehicle body by sliding in a horizontal direction;

upper and lower guide rails fixed to the vehicle body to support the sliding-window panel to slide in the horizontal direction; and a slide driving mechanism fixed to one guide rail either the upper or lower guide rail to operate the sliding-window panel to open and close by driving a motor:

wherein the slide driving mechanism comprises:

the motor;

a lead screw configured to rotate around an axis parallel to a longitudinal direction of the one guide rail by driving the motor; and a screw nut which is screwed with the lead screw to linearly move in the longitudinal direction of the one guide rail by rotation of the lead screw and is coupled with the sliding-window panel to operate the sliding-window panel to open and close by linear movement, and wherein the one guide rail is integrally formed with first and second supporting portions which rotatably support two end portions of the lead screw respectively, wherein the sliding-window panel is coupled with the screw nut through a carrier plate which is coupled with the sliding-window panel and is fitted to the one guide rail to move in the longitudinal direction, wherein the screw nut has a coupling arm portion extending to the carrier plate, and wherein the carrier plate has a sliding portion fitted to the one guide rail to slide in the longitudinal direction, a fitting groove to which the sliding-window panel is fitted such that the carrier plate is coupled with the sliding-window panel, and a coupling groove to which the coupling arm portion of the screw nut is fitted, and wherein the coupling arm portion of the screw nut is fitted to the coupling groove of the carrier plate to relatively move in a direction horizontally perpendicular to the longitudinal direction of the one guide rail.

2. The opening/closing device for the vehicle sliding-window panel according to claim 1, wherein the first and second supporting portions are respectively provided with a sliding bearing, and the two end portions of the lead screw are rotatably inserted into the respective sliding bearings to be rotatably supported by the first and second supporting portions.

3. The opening/closing device for the vehicle sliding-window panel according to claim 1, wherein the sliding window panel has at least one engagement hole at a lower part thereof, and the carrier plate has at least one protrusion configured to fit into the engagement hole.

* * * * *